US012416109B2

(12) United States Patent
Omagari et al.

(10) Patent No.: US 12,416,109 B2
(45) Date of Patent: Sep. 16, 2025

(54) DISPERSION DEVICE AND ACCUMULATION DEVICE

(71) Applicant: SEIKO EPSON CORPORATION, Tokyo (JP)

(72) Inventors: Naoko Omagari, Nagano (JP); Kensaku Matsuda, Nagano (JP); Toshizo Nishi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 110 days.

(21) Appl. No.: 18/395,791

(22) Filed: Dec. 26, 2023

(65) Prior Publication Data

US 2024/0209553 A1 Jun. 27, 2024

(30) Foreign Application Priority Data

Dec. 27, 2022 (JP) ................................ 2022-210776

(51) Int. Cl.

| | |
|---|---|
| ***D04H 1/732*** | (2012.01) |
| ***B01F 25/10*** | (2022.01) |
| ***B04C 3/00*** | (2006.01) |
| ***D01D 7/02*** | (2006.01) |
| ***D21B 1/08*** | (2006.01) |

(52) U.S. Cl.

CPC ............... *D04H 1/732* (2013.01); *D01D 7/02* (2013.01); *D21B 1/08* (2013.01); *B01F 25/102* (2022.01); *B04C 2003/003* (2013.01)

(58) Field of Classification Search

CPC ......... D04H 1/732; B04C 3/00; B01F 25/102; D01D 7/02

See application file for complete search history.

(56) References Cited

U.S. PATENT DOCUMENTS

| | | | | |
|---|---|---|---|---|
| 4,153,488 A * | 5/1979 | Wiegand | ................ | D04H 1/732 156/181 |
| 4,347,983 A * | 9/1982 | Bodai | ...................... | G10K 5/02 239/545 |
| 4,389,307 A * | 6/1983 | Boadway | .................. | B04C 5/28 209/733 |

(Continued)

FOREIGN PATENT DOCUMENTS

| | | |
|---|---|---|
| JP | H05-132843 A | 5/1993 |
| JP | 2003-268666 A | 9/2003 |

*Primary Examiner* — Benjamin A Schiffman

(74) *Attorney, Agent, or Firm* — Global IP Counselors, LLP

(57) ABSTRACT

There is provided a dispersion device including: a supply section having a supply pipe for supplying a material containing fibers together with air, and a chamber that has a first swirl flow forming portion forming a first swirl flow of the air containing the material and a second swirl flow forming portion communicating with the first swirl flow forming portion and forming a second swirl flow in a direction opposite to the first swirl flow of the air containing the material and that is coupled to the supply pipe; a dispersion section that has a casing formed with a discharge port for discharging the material, stirs the material in the casing, and discharges and disperses the material from the discharge port into air; and a coupling section having a communication port through which the first swirl flow forming portion and the second swirl flow forming portion communicate with the casing.

8 Claims, 4 Drawing Sheets

(56) References Cited

U.S. PATENT DOCUMENTS

| | | | | | |
|---|---|---|---|---|---|
| 4,398,827 | A * | 8/1983 | Dietrich | F23D 11/103 239/404 |
| 4,415,275 | A * | 11/1983 | Dietrich | B05B 7/10 366/173.1 |
| 4,464,314 | A * | 8/1984 | Surovikin | B01F 25/102 239/404 |
| 4,480,925 | A * | 11/1984 | Dietrich | B01F 25/46 366/178.2 |
| 4,537,608 | A * | 8/1985 | Koslow | B01D 50/20 55/347 |
| 5,456,596 | A * | 10/1995 | Gourdine | B05B 7/0884 431/9 |
| 5,498,478 | A * | 3/1996 | Hansen | A61F 13/531 428/375 |
| 5,582,644 | A * | 12/1996 | Gaddis | D04H 1/655 366/342 |
| 7,108,138 | B2 * | 9/2006 | Simpson | B01D 45/12 55/459.1 |
| 8,388,994 | B1 * | 3/2013 | Scheer | C08L 31/04 424/425 |
| 9,670,811 | B2 * | 6/2017 | De Rudder | F01N 3/36 |
| 10,596,042 | B2 * | 3/2020 | Fell | A61F 13/1565 |
| 11,306,439 | B2 * | 4/2022 | Higuchi | D21F 1/80 |
| 2016/0145801 | A1 * | 5/2016 | Fujita | D01G 25/00 162/289 |
| 2020/0215479 | A1 * | 7/2020 | Ayaskanta | B01F 23/10 |
| 2024/0110335 | A1 * | 4/2024 | Miyauchi | D21F 9/00 |
| 2024/0209572 | A1 * | 6/2024 | Omagari | D21F 7/00 |
| 2024/0271363 | A1 * | 8/2024 | Omagari | B01F 25/25 |

* cited by examiner

DISPERSION DEVICE AND ACCUMULATION DEVICE

CROSS-REFERENCE TO RELATED APPLICATIONS

The present application is based on, and claims priority from JP Application Serial Number 2022-210776, filed Dec. 27, 2022, the disclosure of which is hereby incorporated by reference herein in its entirety.

BACKGROUND OF THE INVENTION

(1) Field of the Invention

The present disclosure relates to a dispersion device and an accumulation device.

(2) Description of Related Art

In recent years, a dry-type sheet manufacturing apparatus that uses water as little as possible is proposed. As the dry-type sheet manufacturing apparatus, there is known a configuration including a defibrating section that defibrates a raw material containing fibers, such as waste paper, a dispersion section that disperses, in air, a defibrated material generated by the defibrating section, an accumulation section that accumulates the dispersed defibrated material, and a forming section that forms an accumulated material generated by the accumulation section into a sheet shape.

In a sheet manufacturing apparatus disclosed in JP-A-5-132843, the defibrated material is supplied to the dispersion section via a supply pipe, and the defibrated material is stirred and loosened in the dispersion section, and then dispersed.

However, in the apparatus disclosed in JP-A-5-132843, when a lump of the defibrated material that has not been sufficiently loosened is supplied to the dispersion section, the stirring in the dispersion section alone may not sufficiently loose the defibrated material depending on a size, an amount, or the like of the lump of the defibrated material. In this case, the defibrated material cannot be efficiently and satisfactorily dispersed, and there is a problem in that the dispersion section or the like is clogged because of the lump of the remaining defibrated material, which causes a decrease in processing efficiency, apparatus failure, apparatus stoppage, and the like.

BRIEF SUMMARY OF THE INVENTION

According to an aspect of the present disclosure, there is provided a dispersion device including: a supply section having a supply pipe for supplying a material containing fibers together with air, and a chamber that has a first swirl flow forming portion forming a first swirl flow of the air containing the material and a second swirl flow forming portion communicating with the first swirl flow forming portion and forming a second swirl flow in a direction opposite to the first swirl flow of the air containing the material and that is coupled to the supply pipe; a dispersion section that has a casing formed with a discharge port for discharging the material, stirs the material in the casing, and discharges and disperses the material from the discharge port into air; and a coupling section having a communication port through which the first swirl flow forming portion and the second swirl flow forming portion communicate with the casing.

According to another aspect of the present disclosure, there is provided an accumulation device including: a supply section having a supply pipe for supplying a material containing fibers together with air, and a chamber that has a first swirl flow forming portion forming a first swirl flow of the air containing the material and a second swirl flow forming portion communicating with the first swirl flow forming portion and forming a second swirl flow in a direction opposite to the first swirl flow of the air containing the material and that is coupled to the supply pipe; a dispersion section that has a casing formed with a discharge port for discharging the material, stirs the material in the casing, and discharges and disperses the material from the discharge port into air; a coupling section having a communication port through which the first swirl flow forming portion and the second swirl flow forming portion communicate with the casing; and an accumulation section accumulating the material dispersed by the dispersion section.

DETAILED DESCRIPTION OF THE INVENTION

Hereinafter, a dispersion device and an accumulation device of the present disclosure will be described in detail based on preferred embodiments shown in the accompanying drawings.

Embodiment

Figure 1:
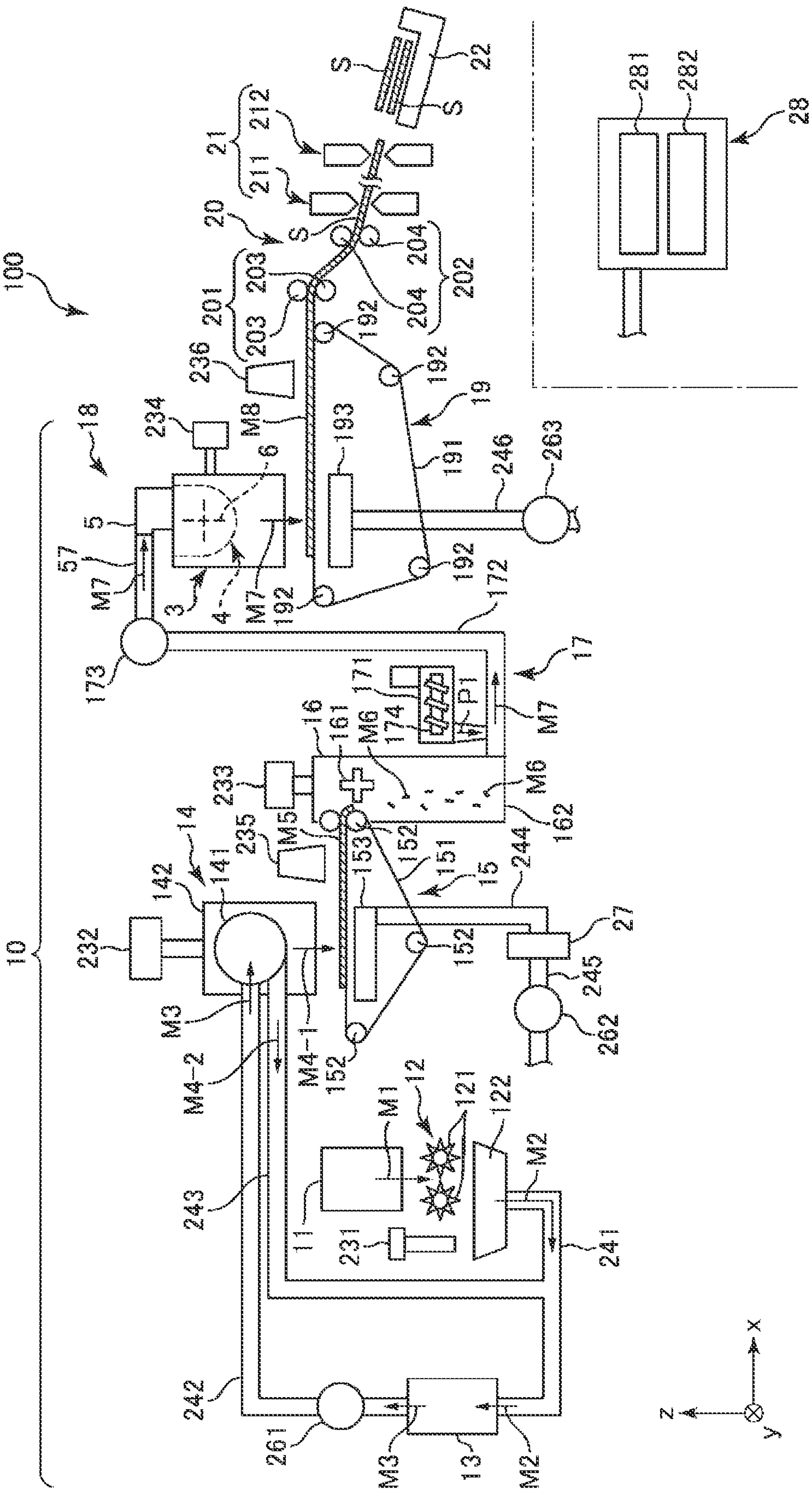
FIG. 1 is a schematic side view illustrating a sheet manufacturing apparatus including a dispersion device and an accumulation device according to an embodiment of the present disclosure.
Figure 2:
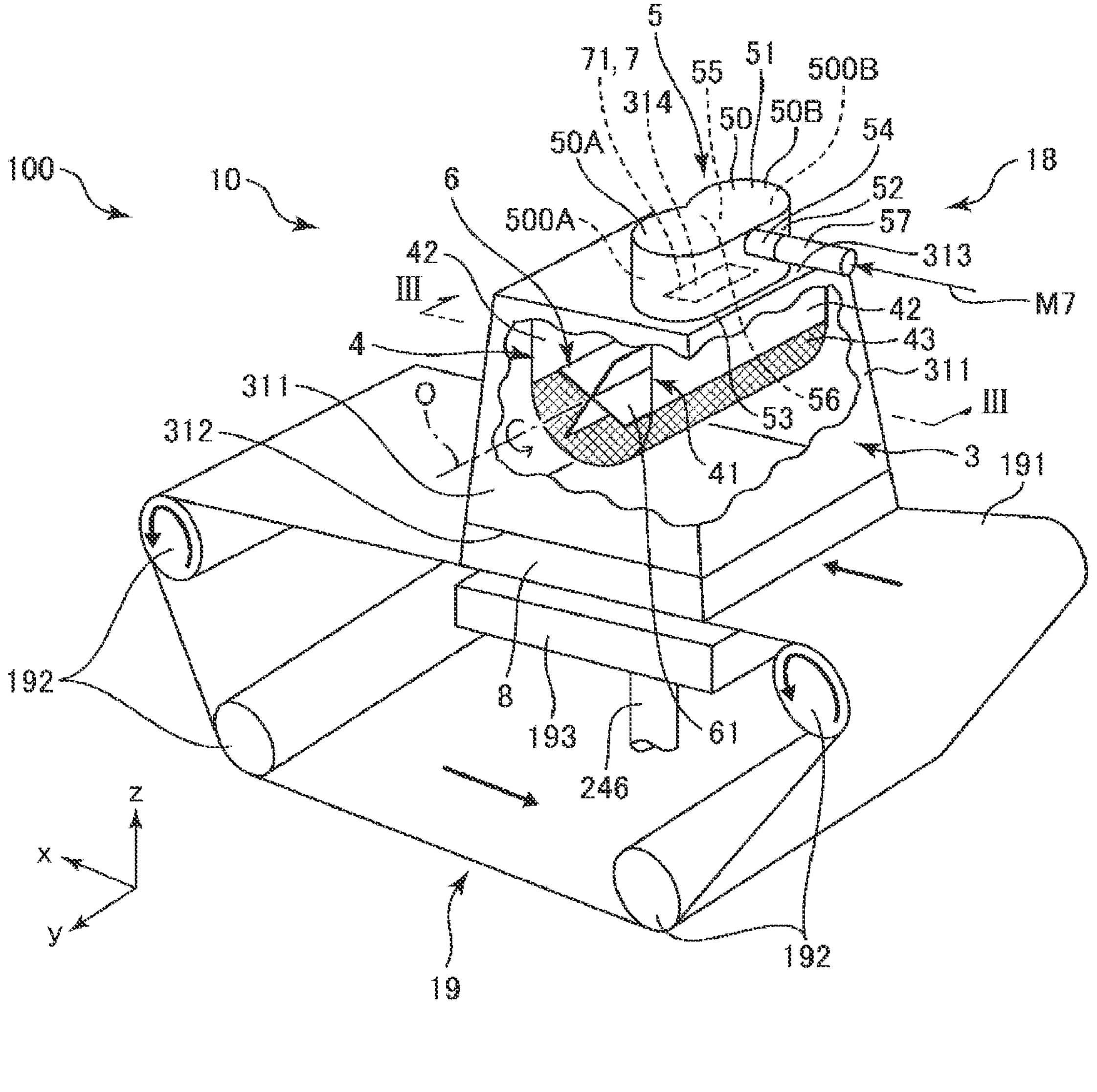
FIG. 2 is a perspective view of the dispersion device and the accumulation device shown in FIG. 1.
Figure 3:
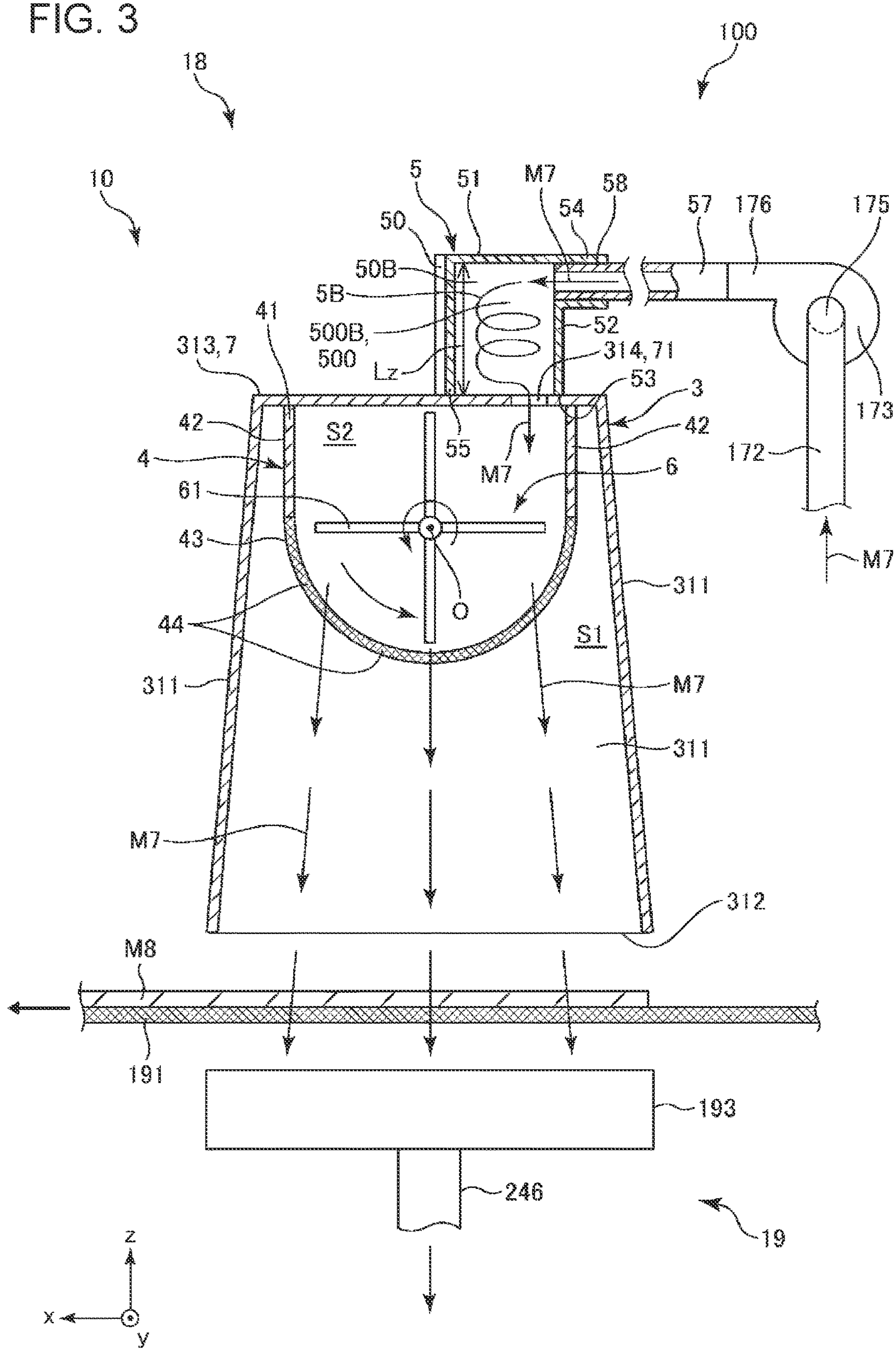
FIG. 3 is a sectional view taken along the line III-III in FIG. 2.
Figure 4:
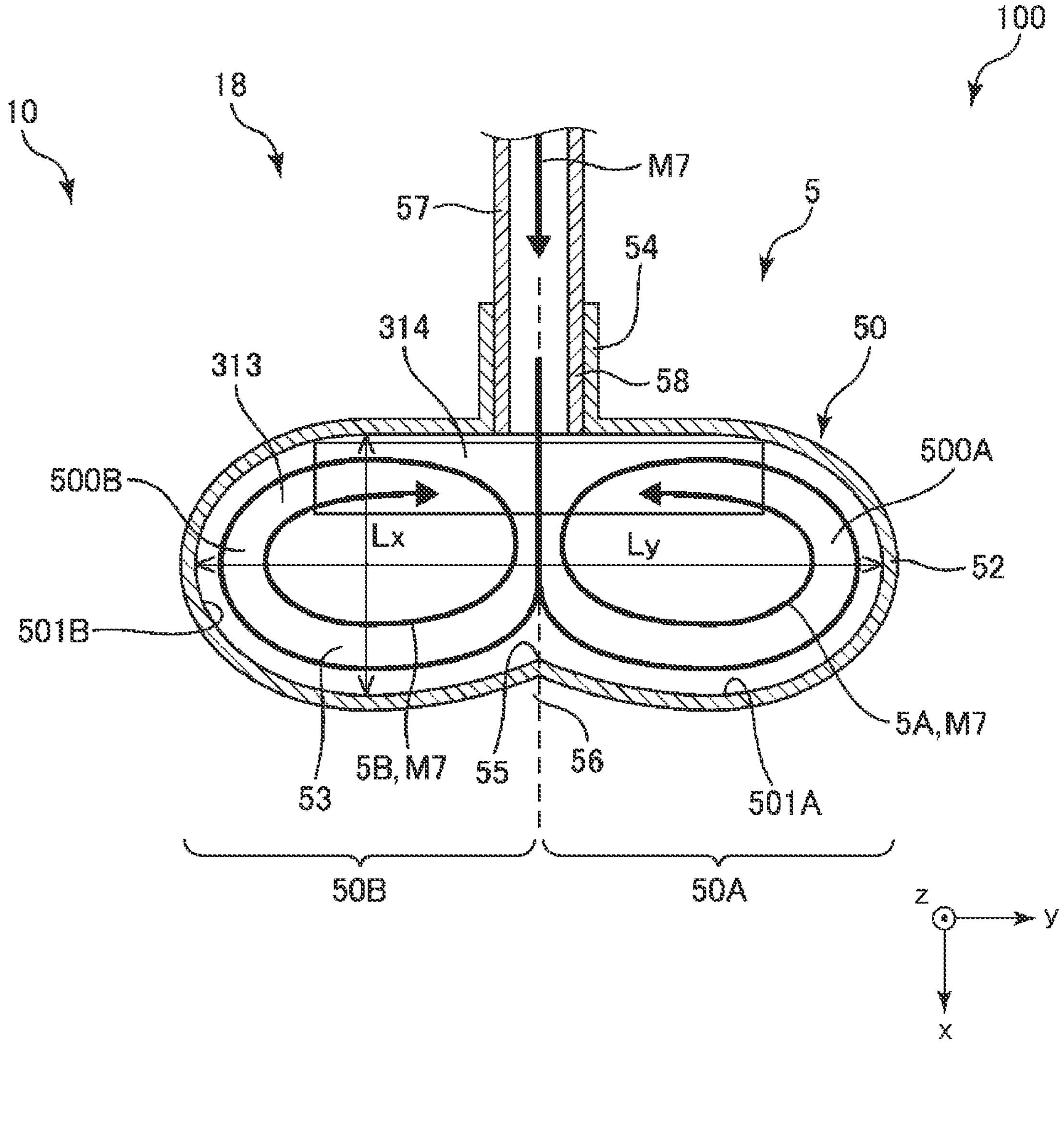
FIG. 4 is a cross-sectional plan view of a supply section illustrated in FIG. 2.

FIG. 1 is a schematic side view illustrating a sheet manufacturing apparatus including a dispersion device and an accumulation device according to an embodiment of the present disclosure. FIG. 2 is a perspective view of the dispersion device and the accumulation device shown in FIG. 1. FIG. 3 is a sectional view taken along the line III-III in FIG. 2. FIG. 4 is a cross-sectional plan view of a supply section illustrated in FIG. 2.

In the following, for convenience of description, as shown in FIGS. 1 to 4, three axes orthogonal to each other are referred to as an x axis, a y axis, and a z axis. In addition, an xy plane including the x axis and the y axis is a horizontal plane, and the z axis is vertical. The state viewed from a z axis direction is referred to as "plan view". In addition, a direction in which an arrow of each axis points is referred to as "+", and the opposite direction is referred to as "−". In addition, an upper side of FIGS. 1, 2, and 3 is referred to as "upper" or "above", and a lower side thereof is referred to as "lower" or "below". In addition, in each drawing, a tip in a direction in which a material containing fibers flows is referred to as "downstream", and the opposite side is referred to as "upstream".

As illustrated in FIG. 1, a sheet manufacturing apparatus 100 includes an accumulation device 10 that is an example of an accumulation device of the present disclosure, a sheet forming section 20, a cutting section 21, a stock section 22, and a collection section 27. The accumulation device 10 includes a raw material supply section 11, a crushing section 12, a defibrating section 13, a sorting section 14, a first web forming section 15, a subdivision section 16, a mixing section 17, a dispersion device 18 that is an example of a dispersion device of the present disclosure, a second web forming section 19, and a controller 28.

In addition, the sheet manufacturing apparatus 100 includes a humidification section 231, a humidification section 232, a humidification section 233, a humidification section 234, a humidification section 235, and a humidification section 236. In addition, the sheet manufacturing apparatus 100 includes a blower 173, a blower 261, a blower 262, and a blower 263.

In the sheet manufacturing apparatus 100, a raw material supply process, a crushing process, a defibrating process, a sorting process, a first web forming process, a fragmenting process, a mixing process, a dispersing process, a second web forming process, a sheet forming process, and a cutting process are executed in this order.

Hereinafter, a configuration of each section will be described.

As illustrated in FIG. 1, the raw material supply section 11 is a portion that performs a raw material supply process of supplying a raw material M1 to the crushing section 12. As the raw material M1, a sheet-like material formed of a fiber-containing material containing cellulose fibers can be used. The cellulose fibers need only be a fibrous material mainly composed of cellulose as a compound, and may contain hemicellulose and lignin in addition to the cellulose. In addition, the raw material M1 may be in any form, such as woven fabric or non-woven fabric. In addition, the raw material M1 may be, for example, recycled paper manufactured by defibrating waste paper or YUPO paper (registered trademark) that is synthetic paper, or need not be recycled paper. In the present embodiment, the raw material M1 is used or unnecessary waste paper.

The crushing section 12 is a portion that performs a crushing process of crushing, in the air such as in the atmosphere, the raw material M1 supplied from the raw material supply section 11. The crushing section 12 has a pair of crushing blades 121 and a chute 122.

By rotating the pair of crushing blades 121 in opposite directions, the raw material M1 can be crushed therebetween, that is, cut into crushed pieces M2. The shape and size of the crushed pieces M2 are preferably suitable for a defibrating process in the defibrating section 13. For example, the crushed pieces M2 are preferably small pieces with a side length of 100 mm or less, and more preferably small pieces with a side length of 10 mm or more and 70 mm or less.

The chute 122 is disposed below the pair of crushing blades 121 and has, for example, a funnel shape. Thereby, the chute 122 can receive the crushed pieces M2 that falls by being crushed by the crushing blades 121.

In addition, above the chute 122, the humidification section 231 is disposed adjacent to the pair of crushing blades 121. The humidification section 231 humidifies the crushed pieces M2 in the chute 122. The humidification section 231 is configured of a vaporization type humidifier, particularly a warm air vaporization type humidifier, which has a filter (not illustrated) containing moisture and supplies humidified air with increased humidity to the crushed pieces M2 by passing air through the filter. By supplying humidified air to the crushed pieces M2, it is possible to suppress adhesion of the crushed pieces M2 to the chute 122 or the like due to static electricity.

The chute 122 is coupled to the defibrating section 13 via a pipe 241. The crushed pieces M2 collected in the chute 122 pass through the pipe 241 and are transported to the defibrating section 13.

The defibrating section 13 is a portion that performs a defibrating process of defibrating the crushed pieces M2 in the air, that is, in a dry manner. By performing the defibrating process in the defibrating section 13, a defibrated material M3 can be generated from the crushed pieces M2. Here, the term "defibrating" means unraveling the crushed pieces M2 formed by binding a plurality of fibers, into individual fibers. Then, the unraveled material becomes the defibrated material M3. The shape of the defibrated material M3 is a linear shape or a belt shape. In addition, the defibrated materials M3 may exist in a state of being intertwined into a mass, that is, in a state of forming a so-called "lump".

For example, in the present embodiment, the defibrating section 13 includes an impeller having a rotor that rotates at a high speed and a liner that is located on an outer periphery of the rotor. The crushed pieces M2 that flowed into the defibrating section 13 are defibrated by being interposed between the rotor and the liner.

In addition, the defibrating section 13 can generate a flow of air from the crushing section 12 toward the sorting section 14, that is, an airflow, by the rotation of the rotor. Thereby, the crushed pieces M2 can be sucked into the defibrating section 13 from the pipe 241. In addition, after the defibrating process, the defibrated material M3 can be sent to the sorting section 14 via a pipe 242.

The blower 261 is installed in the middle of the pipe 242. The blower 261 is an airflow generation device that generates an airflow toward the sorting section 14. This facilitates the sending of the defibrated material M3 to the sorting section 14.

The sorting section 14 is a portion that performs a sorting process of sorting the defibrated material M3 according to the length of the fibers. In the sorting section 14, the defibrated material M3 is sorted into a first sorted material M4-1 and a second sorted material M4-2, which is larger than the first sorted material M4-1. The first sorted material M4-1 has a size suitable for the subsequent manufacture of a sheet S. The average length thereof is preferably 1 μm or more and 30 μm or less. On the other hand, the second sorted material M4-2 includes, for example, those with insufficient defibration and those in which the defibrinated fibers are excessively aggregated.

The sorting section 14 has a drum portion 141 and a housing portion 142 that houses the drum portion 141.

The drum portion 141 is formed of a cylindrical net body, and is a sieve that rotates around a central axis thereof. The defibrated material M3 flows into the drum portion 141. Then, as the drum portion 141 rotates, the defibrated material M3 smaller than a mesh opening of the net is sorted as the first sorted material M4-1, and the defibrated material M3 having a size equal to or larger than the mesh opening of the net is sorted as the second sorted material M4-2.

The first sorted material M4-1 falls from the drum portion 141.

On the other hand, the second sorted material M4-2 is sent to a pipe 243 coupled to the drum portion 141. A part of the pipe 243 on a side opposite to the drum portion 141, that is, an upstream part of the pipe 243 is coupled to the pipe 241. The second sorted material M4-2 that passed through the pipe 243 joins the crushed pieces M2 in the pipe 241 and flows into the defibrating section 13 together with the crushed pieces M2. Thereby, the second sorted material M4-2 is returned to the defibrating section 13, and is defibrated together with the crushed pieces M2.

In addition, the first sorted material M4-1 falls from the drum portion 141 while being dispersed in the air, and travels to the first web forming section 15 located below the drum portion 141. The first web forming section 15 is a portion that performs a first web forming process of forming a first web M5 from the first sorted material M4-1. The first web forming section 15 has a mesh belt 151, three tension rollers 152, and a suction portion 153.

The mesh belt 151 is an endless belt, and the first sorted material M4-1 is accumulated thereon. The mesh belt 151 is hung around the three tension rollers 152. Then, the first sorted material M4-1 on the mesh belt 151 is transported to the downstream by the rotational drive of the tension rollers 152.

The first sorted material M4-1 has a size equal to or larger than a mesh opening of the mesh belt 151. Thereby, the first sorted material M4-1 is restricted from passing through the mesh belt 151, and therefore can be accumulated on the mesh belt 151. In addition, the first sorted material M4-1 is transported to the downstream together with the mesh belt 151 while being accumulated on the mesh belt 151, so that the first sorted material M4-1 is formed as a layered first web M5.

In addition, there is a concern that dust, dirt, or the like is mixed in the first sorted material M4-1. Dust or dirt may be generated by, for example, crushing or defibrating. Then, such dust or dirt is collected in the collection section 27, which will be described below.

The suction portion 153 is a suction mechanism that sucks air from below the mesh belt 151. Thereby, dust or dirt that passed through the mesh belt 151 can be sucked together with air.

In addition, the suction portion 153 is coupled to the collection section 27 via a pipe 244. The dust or dirt sucked by the suction portion 153 is collected in the collection section 27.

A pipe 245 is further coupled to the collection section 27. In addition, the blower 262 is installed in the middle of the pipe 245. By operating the blower 262, a suction force can be generated in the suction portion 153. This facilitates the formation of the first web M5 on the mesh belt 151. This first web M5 is free of the dust or dirt. In addition, the dust or dirt passes through the pipe 244 and reaches the collection section 27 by the operation of the blower 262.

The housing portion 142 is coupled to the humidification section 232. The humidification section 232 is configured of a vaporization type humidifier similar to the humidification section 231. Thereby, humidified air is supplied into the housing portion 142. The first sorted material M4-1 can be humidified with the humidified air, thereby also suppressing adhesion of the first sorted material M4-1 to an inner wall of the housing portion 142 due to electrostatic force.

The humidification section 235 is disposed downstream of the sorting section 14. The humidification section 235 is configured of an ultrasonic humidifier that sprays water. Thereby, moisture can be supplied to the first web M5, and thus the amount of moisture of the first web M5 is adjusted. By this adjustment, the adsorption of the first web M5 to the mesh belt 151 due to electrostatic force can be suppressed. Thereby, the first web M5 is easily peeled off from the mesh belt 151 at a position where the mesh belt 151 is folded back by the tension rollers 152.

The subdivision section 16 is disposed downstream of the humidification section 235. The subdivision section 16 is a portion that performs a fragmenting process of fragmenting the first web M5 peeled off from the mesh belt 151. The subdivision section 16 has a propeller 161 that is supported rotatably, and a housing portion 162 that houses the propeller 161. Then, the first web M5 can be fragmented by the rotating propeller 161. The fragmented first webs M5 become subdivided bodies M6. In addition, the subdivided bodies M6 descend in the housing portion 162.

The housing portion 162 is coupled to the humidification section 233. The humidification section 233 is configured of a vaporization type humidifier similar to the humidification section 231. Thereby, humidified air is supplied into the housing portion 162. The humidified air can also suppress adhesion of the subdivided bodies M6 to the propeller 161 or an inner wall of the housing portion 162 due to electrostatic force.

The mixing section 17 is disposed downstream of the subdivision section 16. The mixing section 17 is a portion that performs a mixing process of mixing the subdivided bodies M6 and a binder P1. The mixing section 17 has a binder supply portion 171, a pipe 172, and a blower 173.

An upstream end part of the pipe 172 is coupled to the housing portion 162 of the subdivision section 16, and a downstream end part of the pipe 172 is coupled to a suction port 175 of the blower 173. By operating the blower 173, a mixture M7 of the subdivided bodies M6 and the binder P1 is sent toward a downstream part in the pipe 172.

The binder supply portion 171 is coupled in the middle of the pipe 172. The binder supply portion 171 has a screw feeder 174. When the screw feeder 174 is rotationally driven, the binder P1 can be quantitatively supplied to the pipe 172 as powders or particles. The binder P1 supplied to the pipe 172 is mixed with the subdivided bodies M6 at a desired ratio to form the mixture M7.

Examples of the binder P1 include: natural product-derived ingredients such as starch, dextrin, glycogen, amylose, hyaluronic acid, arrowroot, konjac, potato starch, etherified starch, esterified starch, natural gum glue, fiber-derived glue, seaweed, and animal protein; polyvinyl alcohol; polyacrylic acid; and polyacrylamide, and one or two or more selected from these can be used in combination. However, a natural product-derived ingredient is preferable, and starch is more preferable. In addition, for example, thermoplastic resins such as various polyolefins, acrylic resins, polyvinyl chloride, polyesters, and polyamides; and various thermoplastic elastomers can be used.

In addition to the binder P1, the material supplied from the binder supply portion 171 may include, for example, a colorant for coloring fibers, an aggregation suppressing agent for suppressing aggregation of fibers or aggregation of the binder P1, a flame retardant for making fibers and the like less flammable, and a paper strength enhancer for enhancing a paper strength of the sheet S. Alternatively, the materials are contained and compounded in the binder P1 beforehand, and the resultant may be supplied from the binder supply portion 171.

The blower 173 is installed downstream of the pipe 172, the dispersion device 18 is installed downstream of the blower 173, and the second web forming section 19 is installed downstream of the dispersion device 18. An upstream end part of a supply pipe 57 of the dispersion device 18 is coupled to an ejection port 176 of the blower 173.

The subdivided bodies M6 and the binder P1 in the pipe 172 are introduced into the blower 173 by an airflow generated by the action of a rotating blade installed inside the blower 173, and are stirred and mixed. In addition, the blower 173 discharges the airflow toward the downstream from the ejection port by the action of the rotating blade. That is, an airflow toward the dispersion device 18 is generated. Such an airflow enables the stirring and mixing of the subdivided bodies M6 and the binder P1, and the resulting mixture M7 flows through the supply pipe 57 into the dispersion device 18 in a state where the subdivided bodies M6 and the binder P1 are uniformly dispersed. In addition, the subdivided bodies M6 in the mixture M7 are loosened in the process of passing through the pipe 172 and the blower 173 to have a finer fibrous shape.

The dispersion device 18 performs a dispersing process of loosening intertwined fibers in a material containing fibers, that is, in the mixture M7, and dispersing the fibers in the air. A configuration of the dispersion device 18 will be described in detail below. The mixture M7 dispersed in the air by the dispersion device 18 falls, and travels to the second web forming section 19 located below the dispersion device 18.

The second web forming section 19 is an accumulation section that accumulates the mixture M7 dispersed by the dispersion device 18, and is a portion that performs a second web forming process of forming a second web M8 from the mixture M7. The second web forming section 19 has a mesh belt 191, four tension rollers 192, and a suction portion 193.

The mesh belt 191 is an endless belt, and the mixture M7 is accumulated thereon. The mesh belt 191 is hung around the four tension rollers 192. Then, the mixture M7 on the mesh belt 191 is transported to the downstream by the rotational drive of the tension rollers 192.

In addition, most of the mixture M7 on the mesh belt 191 has a size equal to or larger than a mesh opening of the mesh belt 191. Thereby, the mixture M7 is restricted from passing through the mesh belt 191, and therefore can be accumulated on the mesh belt 191. In addition, the mixture M7 is transported to the downstream together with the mesh belt 191 while being accumulated on the mesh belt 191, so that the mixture M7 is formed as a layered second web M8.

The suction portion 193 is a suction mechanism that sucks air from below the mesh belt 191. Thereby, the mixture M7 can be sucked onto the mesh belt 191, and thus, this facilitates the accumulation of the mixture M7 on the mesh belt 191.

A pipe 246 is coupled to the suction portion 193. In addition, the blower 263 is installed in the middle of the pipe 246. By operating the blower 263, a suction force can be generated in the suction portion 193.

The humidification section 236 is disposed downstream of the dispersion device 18. The humidification section 236 is configured of an ultrasonic humidifier similar to the humidification section 235. Thereby, moisture can be supplied to the second web M8, and thus the amount of moisture of the second web M8 is adjusted. By this adjustment, the adsorption of the second web M8 to the mesh belt 191 due to electrostatic force can be suppressed. Thereby, the second web M8 is easily peeled off from the mesh belt 191 at a position where the mesh belt 191 is folded back by the tension rollers 192.

The total amount of moisture added to the humidification section 231 to the humidification section 236 is, for example, preferably 0.5 parts by mass or more and 20 parts by mass or less with respect to 100 parts by mass of the material before humidification.

The sheet forming section 20 is disposed downstream of the second web forming section 19. The sheet forming section 20 is a portion that performs a sheet forming process of forming the sheet S from the second web M8. The sheet forming section 20 has a pressurizing portion 201 and a heating portion 202.

The pressurizing portion 201 has a pair of calender rollers 203, and can pressurize the second web M8 between the calender rollers 203 without heating the second web M8. Thereby, a density of the second web M8 is increased. An extent of the heating at this time is preferably, for example, such that the binder P1 is not melted. Then, the second web M8 is transported toward the heating portion 202. One of the pair of calender rollers 203 is a main roller driven by an operation of a motor (not illustrated), and the other is a driven roller.

The heating portion 202 has a pair of heating rollers 204, and can pressurize the second web M8 while heating the second web M8 between the heating rollers 204. By this heating and pressurization, the binder P1 is melted in the second web M8, and fibers are bound to each other through the melted binder P1. Thereby, the sheet S is formed. The sheet S is transported toward the cutting section 21. One of the pair of heating rollers 204 is a main roller driven by an operation of a motor (not illustrated), and the other is a driven roller.

The cutting section 21 is disposed downstream of the sheet forming section 20. The cutting section 21 is a portion that performs a cutting process of cutting the sheet S. The cutting section 21 has a first cutter 211 and a second cutter 212.

The first cutter 211 cuts the sheet S in a direction intersecting a transport direction of the sheet S, particularly in a direction orthogonal to the transport direction.

The second cutter 212 is located downstream of the first cutter 211, and cuts the sheet S in a direction parallel to the transport direction of the sheet S. The cutting is a process of removing unnecessary portions at both end parts of the sheet S, that is, end parts in the +y axis direction and in the −y axis direction to adjust a width of the sheet S. In addition, the portion removed by the cutting is referred to as a so-called "offcut".

Through such cutting with the first cutter 211 and the second cutter 212, the sheet S having a desired shape and size can be obtained. The sheet S is transported further downstream and accumulated in the stock section 22.

Each section included in such a sheet manufacturing apparatus 100 is electrically coupled to the controller 28. The operations of these sections are controlled by the controller 28.

The controller 28 has a central processing unit (CPU) 281 and a storage 282. For example, the CPU 281 can make various determinations and various commands.

The storage 282 stores various programs, such as a program for manufacturing the sheet S, various calibration curves, a table, and the like.

The controller 28 may be built in the sheet manufacturing apparatus 100 or may be provided in an external device such as an external computer. For example, the external device may communicate with the sheet manufacturing apparatus 100 via a cable or the like, may wirelessly communicate with the sheet manufacturing apparatus 100, or may be connected to the sheet manufacturing apparatus 100 via a network such as the Internet.

In addition, for example, the CPU 281 and the storage 282 may be integrated into one unit, the CPU 281 may be built in the sheet manufacturing apparatus 100 and the storage 282 may be provided in an external device such as an external computer, or the storage 282 may be built in the sheet manufacturing apparatus 100 and the CPU 281 may be provided in an external device such as an external computer.

Next, the dispersion device 18 will be described.

As illustrated in FIGS. 2 and 3, the dispersion device 18 includes a dispersion section 4 that disperses the mixture M7, a supply section 5 that supplies the mixture M7 to the dispersion section 4, a coupling section 7 that couples the supply section 5 and the dispersion section 4, and a housing 3 that covers the dispersion section 4.

The housing 3 is configured of a casing having four side walls 311 and a top plate 313 located above the side walls 311. A space S1 surrounded by the four side walls 311 and the top plate 313 is formed inside the housing 3, and the dispersion section 4 is housed in the space S1. Therefore, the space S1 is also referred to as a dispersion space. In addition, most of a portion between the dispersion section 4 and the mesh belt 191 is covered with the housing 3.

The housing 3 has a lower opening 312 facing the mesh belt 191. The lower opening 312 constitutes a discharge section that discharges the mixture M7, which is dispersed by the dispersion section 4 and descends in the space S1, toward the second web forming section 19. A separation distance between the lower opening 312 and the mesh belt 191 is set to a value suitable for forming the second web M8, and is, for example, 0 mm or more and 10 mm or less.

At least one of the four side walls 311 constituting the housing 3 is inclined in a vertical direction. In the present embodiment, each of the four side walls 311 is inclined in the vertical direction, and forms a skirt portion that widens toward the lower opening 312. In other words, the space S1 of the housing 3 has a shape in which an area of a cross section parallel to a horizontal plane gradually increases downward, that is, in the −z axis direction. Thereby, the stirring and loosening effects of the mixture M7 that descends in the space S1 toward the second web forming section 19 are more satisfactorily exhibited, and the second web M8 with a desired area and thickness, that is, with a necessary and sufficient area and thickness can be formed on the mesh belt 191.

The space S1 of the housing 3 may have a shape in which the area of the cross section parallel to the horizontal plane is constant along the z axis direction.

The mixture M7 is sufficiently stirred and loosened by the supply section 5 and the dispersion section 4, and the loosening by stirring is continued in the space S1 of the housing 3, so that a homogeneous and uniform accumulated material of the mixture M7 without a lump of fibers, that is, the second web M8 is obtained in the second web forming section 19.

The top plate 313 is provided with an opening 314. The opening 314 is also a communication port 71 through which a stirring space 500 of the supply section 5 and an accommodation space S2 of the dispersion section 4 communicate with each other, and is configured of a long hole extending in the y axis direction, that is, in a first direction parallel to a rotation axis O. The mixture M7 supplied from the supply section 5 is supplied into the dispersion section 4 through the opening 314.

In addition, as illustrated in FIG. 1, the humidification section 234 is coupled to the housing 3. The humidification section 234 is configured of a vaporization type humidifier similar to the humidification section 231. Thereby, in the housing 3, humidified air generated by the humidification section 234 is supplied to the space S1 in the housing 3. The inside of the housing 3 can be humidified with the humidified air, thereby also suppressing adhesion of the mixture M7 dispersed by the dispersion section 4 to an inner wall of the housing 3 due to electrostatic force.

As illustrated in FIGS. 2 and 3, the dispersion section 4 has a casing 41 and a stirring member 6 that rotates inside the casing 41. The casing 41 is joined to a lower surface of the top plate 313 of the housing 3, and has a pair of side walls 42 disposed parallel to each other and a porous screen 43 joined to lower ends of both side walls 42 and formed with the discharge port 44 for discharging the mixture M7. The discharge port 44 is configured of a plurality of small holes.

The pair of side walls 42 have an elongated shape extending in the y axis direction, and are disposed at a predetermined distance in the x axis direction with the opening 314 interposed therebetween.

The porous screen 43 has a semi-cylindrical shape extending in the y axis direction and curved and protruding downward, that is, in the −z axis direction. That is, the porous screen 43 has an arc shape at any position in the y axis direction when viewed in a cross section with the y axis as a normal line. Thereby, the mixture M7 can move smoothly in the dispersion section 4, and the stirring is performed satisfactorily. In addition, two upper ends of the porous screen 43 are coupled to the lower ends of the pair of side walls 42, respectively. An end part on the −y axis side and an end part on the +y axis side of the casing 41 are closed by shielding walls (not illustrated), respectively. A rotation axis of the stirring member 6 described below is supported so as to be rotatable by a pair of the shielding walls.

A space defined by the pair of side walls 42, the porous screen 43, the pair of shielding walls, and the top plate 313 is the accommodation space S2 in which the mixture M7 is accommodated. The accommodation space S2 has a function as a second stirring space for further stirring and loosening the mixture M7 with respect to the stirring space 500 of the supply section 5, and the space S1 has a function as a third stirring space for further stirring and loosening the mixture M7 transferred from the accommodation space S2.

The porous screen 43 can be made of, for example, a net-like body such as a mesh or a plate material having a large number of through-holes. Thereby, the mixture M7 in the dispersion section 4 is discharged to an outside of the accommodation space S2 via the discharge port 44 of the porous screen 43 and dispersed into the space S1. In addition, by appropriately setting the size of a mesh opening or the size of the through-holes of the porous screen 43, the mixture M7 having a desired fiber length can be preferentially dispersed and accumulated on the mesh belt 191.

The stirring member 6 has a function of facilitating the dispersion of the mixture M7 from the porous screen 43 while stirring and loosening the mixture M7 supplied into the dispersion section 4 by rotating in the accommodation space S2 of the dispersion section 4. The stirring member 6 has four blades 61 disposed around the rotation axis O at equal angular intervals. The blade 61 is made of an elongated plate material extending in the y axis direction. End parts on one long side of the blades 61 are coupled to each other, and the stirring member 6 rotates about the coupled portion as the center of rotation, that is, the rotation axis O. In the present embodiment, the stirring member 6 has a cross-shaped cross section with the rotation axis O as a normal line.

In addition, the stirring member 6 is coupled to a rotational drive source (not illustrated), and the operation of the rotational drive source is controlled by the controller 28 illustrated in FIG. 1. In the present embodiment, the stirring member 6 rotates clockwise when viewed from the +y axis side.

By the rotation of the stirring member 6, each blade 61 presses an appropriate amount of the mixture M7 against the porous screen 43 while stirring and loosening the mixture M7 in the accommodation space S2. Thereby, the mixture M7 can be evenly discharged and dispersed satisfactorily from the entire region of the porous screen 43 while preventing the mixture M7 from being excessively supplied and clogging the porous screen 43.

In addition, the stirring member 6 rotates in a state where each blade 61 is separated from the side wall 42 and the porous screen 43. Thereby, the rotation of the stirring member 6 can be smoothly performed, and the mixture M7 can be prevented from being pressurized excessively between the blade 61 and the porous screen 43, so that more favorable dispersion can be performed.

In the present embodiment, a case where four blades 61 are provided is described, but the present disclosure is not limited to this, and for example, the number of the blades 61 may be one to three, or four or more. In addition, a case where each blade 61 has a flat plate shape is described, but the present disclosure is not limited to this, and for example, each blade 61 may have a shape curved in one direction when viewed in a cross section with the rotation axis O as a normal line. As described above, a configuration of the stirring member 6, particularly the shape, the number, the disposition, and the like of the blades 61 are not limited to the illustrated configuration. In addition, in the dispersion section 4, the stirring member 6 itself may be omitted, or a stirring mechanism different from the illustrated mechanism, for example, a mechanism having a stirring member that does not rotate but reciprocates may be installed.

The supply section 5 is installed above the top plate 313 of the housing 3. As illustrated in FIG. 4, the supply section 5 supplies, to the dispersion section 4, the mixture M7 supplied from the supply pipe 57 while stirring and loosening the mixture M7 by a first swirl flow 5A and a second swirl flow 5B. The supply section 5 includes the chamber 50 having the stirring space 500 inside. The chamber 50 has a top plate 51 and a side wall 52 erected downward from an edge portion of the top plate 51, that is, in the −z axis direction. The top plate 51 has a shape like glasses in plan view. The side wall 52 is provided to surround a space of a lower portion of the top plate 51 over the entire circumference of the edge portion of the top plate 51.

A coupling port 54 is provided at an upper portion of the side wall 52, that is, at a portion on the +z axis side and on the −x axis side. The coupling port 54 is a tubular port formed to protrude in the −x axis direction. An end part 58, which is a downstream part, of the supply pipe 57 is coupled to the coupling port 54. On the other hand, an end part, which is an upstream part, of the supply pipe 57 is coupled to the ejection port 176 of the blower 173. By operating the blower 173, the mixture M7 of the subdivided bodies M6 and the binder P1 is ejected from the ejection port 176, passes through the supply pipe 57 and the coupling port 54 sequentially, and flows into the chamber 50 together with air.

In the present embodiment, pipe axes of the end part 58 of the supply pipe 57 and the coupling port 54 are disposed parallel to the x axis direction. However, the present disclosure is not limited to this, and the end part 58 and the coupling port 54 may be disposed to be inclined at a predetermined angle with respect to the x axis.

In addition, a lower portion of the chamber 50 has a lower opening 53 that is open downward. The lower opening 53 is an opening formed along a lower end of the side wall 52, that is, an end part on the −z axis side. The chamber 50 is joined to an upper surface of the top plate 313 such that the lower opening 53 is closed by the top plate 313 of the housing 3.

The lower opening 53 includes the opening 314 when viewed in plan view, that is, when viewed in the z axis direction. Thereby, an inside of the chamber 50, that is, a stirring space 500A of a first swirl flow forming portion 50A and a stirring space 500B of a second swirl flow forming portion 50B, and an inside of the casing 41, that is, the accommodation space S2 communicate with each other via the lower opening 53 and the opening 314. In other words, the opening 314 is the communication port 71 through which the first swirl flow forming portion 50A and the second swirl flow forming portion 50B communicate with the casing 41.

The top plate 313 formed with the communication port 71 supports and fixes the casing 41 of the dispersion section 4 on a bottom surface side thereof, and supports and fixes the chamber 50 of the supply section 5 on an upper surface side thereof. That is, the casing 41 of the dispersion section 4 and the chamber 50 of the supply section 5 are coupled via the top plate 313. Thereby, the top plate 313 functions as the coupling section 7 that couples the dispersion section 4 and the supply section 5.

However, the present disclosure is not limited to this configuration, and the coupling section 7 may be configured of a coupling member such as a coupling pipe or a duct that couples the chamber 50 and the casing 41, for example, with another configuration.

As illustrated in FIG. 4, the chamber 50 has the first swirl flow forming portion 50A that forms the first swirl flow 5A of air containing the mixture M7, and the second swirl flow forming portion 50B that communicates with the first swirl flow forming portion 50A and that forms second swirl flow 5B of air containing the mixture M7. A swirl direction of the first swirl flow 5A is opposite to a swirl direction of the second swirl flow 5B. The first swirl flow forming portion 50A and the second swirl flow forming portion 50B communicate with each other via a boundary portion 56.

The chamber 50 has the stirring space 500 for stirring and loosening the mixture M7 therein. The stirring space 500 is a space surrounded by the top plate 51, the side wall 52, and the top plate 313. The stirring space 500 is configured of the stirring space 500A and the stirring space 500B that communicate with each other. An internal space of the first swirl flow forming portion 50A is the stirring space 500A, and an internal space of the second swirl flow forming portion 50B is the stirring space 500B.

The first swirl flow forming portion 50A and the second swirl flow forming portion 50B are disposed side by side in the y axis direction, that is, in an extending direction of the opening 314, or in an axial direction of the rotation axis O. The first swirl flow forming portion 50A is located on the +y axis side, and the second swirl flow forming portion 50B is located on the −y axis side. The end part 58 of the supply pipe 57 and the coupling port 54 are coupled to the boundary portion 56 between the first swirl flow forming portion 50A and the second swirl flow forming portion 50B.

A protrusion portion 55 is provided on a portion, on the +x axis side of the boundary portion 56, of an inner surface of the side wall 52, that is, a surface facing the stirring space 500. The protrusion portion 55 is formed to protrude in a chevron shape toward the −x axis side, that is, toward the coupling port 54 side. The protrusion portion 55 has a width that narrows toward the −x axis, and has a sharp tip. The protrusion portion 55 is formed over the entire region in z axis direction. Even when the protrusion portion 55 is omitted, the effect of the present disclosure can be obtained.

The first swirl flow forming portion 50A is a portion where the first swirl flow 5A of air containing the mixture M7 is formed, and the second swirl flow forming portion 50B is a portion where the second swirl flow 5B of air containing the mixture M7 is formed.

As illustrated in FIG. 4, the inner surface of the side wall 52 of the first swirl flow forming portion 50A is a first curved surface 501A that is curved to protrude outward. In the first curved surface 501A, a curvature of a portion on the +y axis side is larger than that of a portion on the +x axis side.

It is preferable that R2≥R1, and more preferable that R2>R1, in which a radius of curvature of the portion of the first curved surface 501A on the +y axis side is R1, and a radius of curvature of the portion of the first curved surface 501A on the +x axis side is R2. In this case, a value of R1/R2 is not particularly limited, but is preferably 0.2 or more and 0.9 or less, and more preferably 0.3 or more and 0.75 or less. Thereby, a swirl flow more suitable for stirring can be formed.

The inner surface of the side wall 52 of the second swirl flow forming portion 50B is a second curved surface 501B that is curved to protrude outward. In the second curved surface 501B, a curvature of a portion on the −y axis side is larger than that of a portion on the +x axis side. The magnitude relationships and ratios of radii of curvature of these portions are the same as those of the first curved surface 501A.

As illustrated in FIG. 4, the first swirl flow forming portion 50A and the second swirl flow forming portion 50B have a shape that is symmetrical with respect to the boundary portion 56 therebetween. That is, the first curved surface 501A and the second curved surface 501B have a shape that is symmetrical with respect to the boundary portion 56. Thereby, the shapes of the first swirl flow 5A and the second swirl flow 5B can be formed in a well-balanced manner, and the strength and the swirl speed of both swirl flows can be made more uniform. The boundary portion 56 is configured of a plane parallel to the x-z plane.

Air containing the mixture M7 (hereinafter, simply referred to as "air") flowing through the supply pipe 57 in the downstream direction and supplied from the coupling port 54 to the stirring space 500 first advances in the +x axis direction in the stirring space 500, and hits the protrusion portion 55 and is divided into the +y axis side and the −y axis side. That is, the air supplied from the coupling port 54 to the stirring space 500 is divided into the stirring space 500A and the stirring space 500B by the protrusion portion 55.

Here, it is preferable that the amount of the air that is divided and flows into the stirring space 500A, that is, the amount of the mixture M7 is substantially equal to the amount of the air that flows into the stirring space 500B, that is, the amount of the mixture M7, but the present disclosure is not limited to this, and for example, a ratio of the former air amount VA to the latter air amount VB may be in a range of 1:5 to 5:1.

The air divided into the stirring space 500A flows downward (in the −z axis direction) and toward a center portion of the swirling while swirling counterclockwise in FIG. 4 along the first curved surface 501A, to form the first swirl flow 5A. On the other hand, the air divided into the stirring space 500B flows downward (in the −z axis direction) and toward a center portion of the swirling while swirling clockwise in FIG. 4 along the second curved surface 501B, to form the second swirl flow 5B as illustrated in FIG. 3. When the first swirl flow 5A and the second swirl flow 5B reach a lower portion of the stirring space 500, the first swirl flow 5A and the second swirl flow 5B travel toward the opening 314 formed in the top plate 313, that is, the communication port 71.

The first swirl flow 5A and the second swirl flow 5B are airflows that travel toward the opening 314 while swirling in opposite directions. The mixture M7 supplied from the coupling port 54 together with air is divided in the vicinity of the protrusion portion 55, and is stirred and loosened with the airflow of each of the first swirl flow 5A and the second swirl flow 5B. Then, the first swirl flow 5A and the second swirl flow 5B containing the mixture M7 join together in the vicinity of the opening 314, and pass through the opening 314 and flow into the dispersion section 4 in a state where the stirring is further promoted and the mixture M7 is sufficiently loosened.

As described above, the supply section 5 supplies the mixture M7 to the dispersion section 4 in a state where the mixture M7 is stirred and loosened by the first swirl flow 5A and the second swirl flow 5B, prior to dispersion of the mixture M7 by the dispersion section 4. Thereby, the dispersion section 4 can more satisfactorily disperse the mixture M7. That is, when the mixture M7 passes through the discharge port 44 of the porous screen 43, the mixture M7 can be evenly dispersed from the entire region of the porous screen 43 while preventing the discharge port 44 from being clogged. Thereby, the mixture M7 can be smoothly and satisfactorily dispersed.

As illustrated in FIGS. 3 and 4, when the length (maximum length) of the stirring space 500 in the x axis direction is Lx, the length (maximum length) of the stirring space 500 in the y axis direction is Ly, and the length (maximum length) of the stirring space 500 in the z axis direction is Lz, it is preferable that the following relationship is satisfied.

Ly/Lx is not particularly limited, but is preferably 1.0 or more and 5.0 or less, and more preferably 2.0 or more and 4.0 or less. Thereby, the first swirl flow 5A and the second swirl flow 5B can be formed more satisfactorily, and the stirring and loosening effects of the mixture M7 are enhanced.

Lz/Lx is not particularly limited, but is preferably 0.5 or more and 10.0 or less, and more preferably 1.0 or more and 5.0 or less. Thereby, the length of the stirring space 500 in the z axis direction, that is, the pass length of the first swirl flow 5A and the second swirl flow 5B can be sufficiently ensured, and the mixture M7 can be sufficiently stirred and loosened.

Although not illustrated, a straightening plate can also be provided inside the chamber 50. Thereby, the shapes of the first swirl flow 5A and the second swirl flow 5B can be formed more satisfactorily, and the loosening effect of the mixture M7 by the stirring can be further enhanced.

As illustrated in FIG. 3, the opening 314 is provided at a position that does not overlap the rotation axis O when viewed in plan view, that is, when viewed in the z axis direction. That is, the opening 314 is provided on the −x axis side with respect to the rotation axis O. Thereby, the mixture M7 supplied from the supply section 5 to the dispersion section 4 immediately collides with the blade 61 of the stirring member 6 that rotates directly below the opening 314. Accordingly, the stirring by the stirring member 6 can be performed more satisfactorily. In particular, as illustrated in FIG. 3, when the opening 314 is provided on the −x axis side with respect to the rotation axis O, and the stirring member 6 rotates counterclockwise when viewed from the +y axis side, the mixture M7 that passes through the opening 314 and travels downward collides head-on with the rising blade 61. Accordingly, the stirring by the stirring member 6 can be performed more efficiently and satisfactorily, and the loosening effect of the mixture M7 is further enhanced.

The present disclosure is not limited to the above configuration, and the opening 314 may be provided on the +x axis side with respect to the rotation axis O in plan view, or may be provided at a position overlapping the rotation axis O in plan view. When the opening 314 is provided on the +x axis side with respect to the rotation axis O, for example, even when the fiber length of the fibers of the mixture M7 is relatively long or the amount of the mixture M7 supplied per unit time is large, there is an advantage that it is difficult to form a lump in the dispersion section 4.

In addition, the stirring member 6 may be configured such that the rotation direction thereof can be switched between the clockwise rotation and the counterclockwise rotation. In this case, when the opening 314 is provided at a position that does not overlap the rotation axis O in plan view, any of the above-described effects can be selectively obtained by switching the rotation direction of the stirring member 6.

As described above, the dispersion device 18 includes the supply section 5 having the supply pipe 57 for supplying the mixture M7, which is a material containing fibers, together with air, and the chamber 50 that has the first swirl flow forming portion 50A forming the first swirl flow 5A of the air containing the mixture M7 and the second swirl flow forming portion 50B communicating with the first swirl flow forming portion 50A and forming the second swirl flow 5B in a direction opposite to the first swirl flow 5A of the air containing the mixture M7 and that is coupled to the supply pipe 57, the dispersion section 4 that has the casing 41 formed with the discharge port 44 for discharging the mixture M7, stirs the mixture M7 in the casing 41, and discharges and disperses the mixture M7 from the discharge port 44 into air, and the coupling section 7 having the communication port 71 through which the first swirl flow forming portion 50A and the second swirl flow forming portion 50B communicate with the casing 41. Thereby, the supply section 5 can supply the mixture M7 to the dispersion section 4 in a state where the mixture M7 is sufficiently stirred and loosened by the first swirl flow 5A and the second swirl flow 5B in the opposite directions, prior to dispersion of the mixture M7 by the dispersion section 4. Accordingly, the dispersion section 4 can smoothly and satisfactorily disperse the mixture M7 without causing clogging or the like in the discharge port 44.

In addition, the accumulation device 10 includes the supply section 5 having the supply pipe 57 for supplying the mixture M7, which is a material containing fibers, together with air, and the chamber 50 that has the first swirl flow forming portion 50A forming the first swirl flow 5A of the air containing the mixture M7 and the second swirl flow forming portion 50B communicating with the first swirl flow forming portion 50A and forming the second swirl flow 5B in a direction opposite to the first swirl flow 5A of the air containing the mixture M7 and that is coupled to the pipe 172, the dispersion section 4 that has the casing 41 formed with the discharge port 44 for discharging the mixture M7, stirs the mixture M7 in the casing 41, and discharges and disperses the mixture M7 from the discharge port 44 into air, the coupling section 7 having the communication port 71 through which the first swirl flow forming portion 50A and the second swirl flow forming portion 50B communicate with the casing 41, and the second web forming section 19 serving as an accumulation section accumulating the mixture M7 dispersed by the dispersion section 4. Thereby, the supply section 5 can supply the mixture M7 to the dispersion section 4 in a state where the mixture M7 is sufficiently stirred and loosened by the first swirl flow 5A and the second swirl flow 5B in the opposite directions, prior to dispersion of the mixture M7 by the dispersion section 4. Accordingly, the dispersion section 4 can smoothly and satisfactorily disperse the mixture M7 without causing clogging or the like in the discharge port 44. As a result, in the accumulation section, the second web M8 that is a favorable accumulated material having a uniform thickness can be obtained. In addition, in the accumulation section, a homogeneous and uniform second web M8 without the lump of fibers is obtained.

In addition, as described above, the dispersion section 4 has the stirring member 6 installed in the casing 41 and rotating around the rotation axis O. Thereby, the mixture M7 stirred and loosened in the supply section 5 can be further stirred and loosened by the stirring member 6. Accordingly, the dispersion section 4 can further smoothly and satisfactorily disperse the mixture M7 due to the synergistic effect of these two-stage loosening.

The stirring member 6 may be omitted. In this case, for example, it is preferable to form an airflow in the casing 41 to stir and loosen the mixture M7.

In addition, as described above, the communication port 71 has an elongated shape extending along the first direction parallel to the rotation axis O. Thereby, the supply section 5 can supply the mixture M7 to the dispersion section 4 such that the mixture M7 is present at any position in the first direction. Accordingly, the mixture M7 can be stirred and loosened more evenly and satisfactorily by the stirring member 6. As a result, the dispersion section 4 can more satisfactorily disperse the mixture M7.

The present disclosure is not limited to the above configuration, and the communication port 71 (opening 314) may be configured of a plurality of holes, and the holes may be disposed side by side in the y axis direction, that is, in the first direction. In addition, the plurality of holes disposed in the y axis direction may be disposed in a plurality of rows in the x axis direction.

In addition, the coupling section 7 may have a configuration in which the shape, dimension, or opening area of the communication port 71 (opening 314) can be adjusted. Examples of a method of adjusting the opening area of the communication port 71 include installing a shutter that shields the communication port 71 so that an opening degree of the communication port 71 can be changed continuously or stepwise. In addition, the coupling section 7 may have a configuration in which the formation position of the communication port 71 with respect to the supply section 5 and the dispersion section 4 can be adjusted. Thereby, the optimum condition of the communication port 71 for loosening the mixture M7 by the stirring can be set according to various conditions such as the supply amount, the flow velocity, and the flow rate of the mixture M7 from the supply pipe 57.

In addition, as described above, the first swirl flow forming portion 50A and the second swirl flow forming portion 50B are disposed side by side in the first direction parallel to the rotation axis O. Thereby, the supply section 5 can supply the mixture M7 to the dispersion section 4 such that the sufficiently loosened mixture M7 is present at any position in the first direction. Accordingly, the mixture M7 can be stirred and loosened further evenly and satisfactorily by the stirring member 6. As a result, the dispersion section 4 can more satisfactorily disperse the mixture M7.

In addition, as described above, an inner peripheral surface (inner surface of the side wall) of the first swirl flow forming portion 50A is the curved first curved surface 501A, and an inner peripheral surface (inner surface of the side wall) of the second swirl flow forming portion 50B is the curved second curved surface 501B. Thereby, the first swirl flow forming portion 50A can form the first swirl flow 5A more suitable for stirring, and the second swirl flow forming portion 50B can form the second swirl flow 5B more suitable for stirring. Accordingly, the mixture M7 can be stirred and loosened further satisfactorily in the supply section 5.

The present disclosure is not limited to the above configuration, and the inner peripheral surfaces of the first swirl flow forming portion 50A and the second swirl flow forming portion 50B may have a plurality of flat surfaces, or may have a configuration in which a curved surface and a flat surface are combined.

In addition, as described above, the first curved surface 501A and the second curved surface 501B have a shape that is symmetrical with respect to the boundary portion 56 between the first swirl flow forming portion 50A and the second swirl flow forming portion 50B. Thereby, the shapes of the first swirl flow 5A and the second swirl flow 5B can be formed in a well-balanced manner, and the strength and the swirl speed of both swirl flows can be made more uniform. Accordingly, the mixture M7 can be evenly and efficiently stirred and loosened in the supply section 5.

The present disclosure is not limited to the above configuration, and the first curved surface 501A and the second curved surface 501B may have a shape that is asymmetrical with respect to the boundary portion 56.

In addition, as described above, the end part 58, which is a downstream part, of the supply pipe 57 is coupled to the boundary portion 56 between the first swirl flow forming portion 50A and the second swirl flow forming portion 50B. Thereby, the mixture M7 supplied from the supply pipe 57 is divided into the first swirl flow forming portion 50A and the second swirl flow forming portion 50B equally or as close to equal as possible, so that the first swirl flow 5A and the second swirl flow 5B can be formed in a well-balanced manner. Accordingly, the mixture M7 can be evenly stirred and loosened in the supply section 5.

The present disclosure is not limited to the above configuration, and the supply pipe 57 may have a configuration in which the supply pipe 57 is branched into two parts in the middle thereof, a downstream end of one of the branched pipes is coupled to the first swirl flow forming portion 50A, and a downstream end of the other branched pipe is coupled to the second swirl flow forming portion 50B. In this case, a coupling direction and a coupling portion of each branched pipe to the chamber 50 are not particularly limited, and for example, a configuration may be adopted in which each branched pipe is coupled to the chamber 50 from the −x axis side or the +x axis side, or a configuration may be adopted in which one branched pipe is coupled along the first curved surface 501A and the other branched pipe is coupled along the second curved surface 501B.

As described above, although the dispersion device and the accumulation device of the present disclosure are described based on the illustrated embodiment, the present disclosure is not limited to this, and the configuration of each section can be replaced with any configuration having the same function. In addition, in the present disclosure, other any components may be added to the above-described embodiment.

What is claimed is:

1. A dispersion device comprising:

a supply section having a supply pipe for supplying a material containing fibers together with air, and a chamber that has a first swirl flow forming portion forming a first swirl flow of the air containing the material and a second swirl flow forming portion communicating with the first swirl flow forming portion and forming a second swirl flow in a direction opposite to the first swirl flow of the air containing the material and that is coupled to the supply pipe;

a dispersion section that has a casing formed with a discharge port for discharging the material, stirs the material in the casing, and discharges and disperses the material from the discharge port into air; and a coupling section having a communication port through which the first swirl flow forming portion and the second swirl flow forming portion communicate with the casing.

2. The dispersion device according to claim 1, wherein the dispersion section has a stirring member installed in the casing and rotating around a rotation axis.

3. The dispersion device according to claim 2, wherein the communication port has an elongated shape extending in a first direction parallel to the rotation axis.

4. The dispersion device according to claim 2, wherein the first swirl flow forming portion and the second swirl flow forming portion are disposed side by side in a first direction parallel to the rotation axis.

5. The dispersion device according to claim 1, wherein an inner peripheral surface of the first swirl flow forming portion is a curved first curved surface, and an inner peripheral surface of the second swirl flow forming portion is a curved second curved surface.

6. The dispersion device according to claim 5, wherein the first curved surface and the second curved surface have a shape symmetrical with respect to a boundary portion between the first swirl flow forming portion and the second swirl flow forming portion.

7. The dispersion device according to claim 1, wherein an end part, which is a downstream part, of the supply pipe is coupled to a boundary portion between the first swirl flow forming portion and the second swirl flow forming portion.

8. An accumulation device comprising:

a supply section having a supply pipe for supplying a material containing fibers together with air, and a chamber that has a first swirl flow forming portion forming a first swirl flow of the air containing the material and a second swirl flow forming portion communicating with the first swirl flow forming portion and forming a second swirl flow in a direction opposite to the first swirl flow of the air containing the material and that is coupled to the supply pipe;

a dispersion section that has a casing formed with a discharge port for discharging the material, stirs the material in the casing, and discharges and disperses the material from the discharge port into air;

a coupling section having a communication port through which the first swirl flow forming portion and the second swirl flow forming portion communicate with the casing; and an accumulation section accumulating the material dispersed by the dispersion section.

* * * * *